Figure 1:
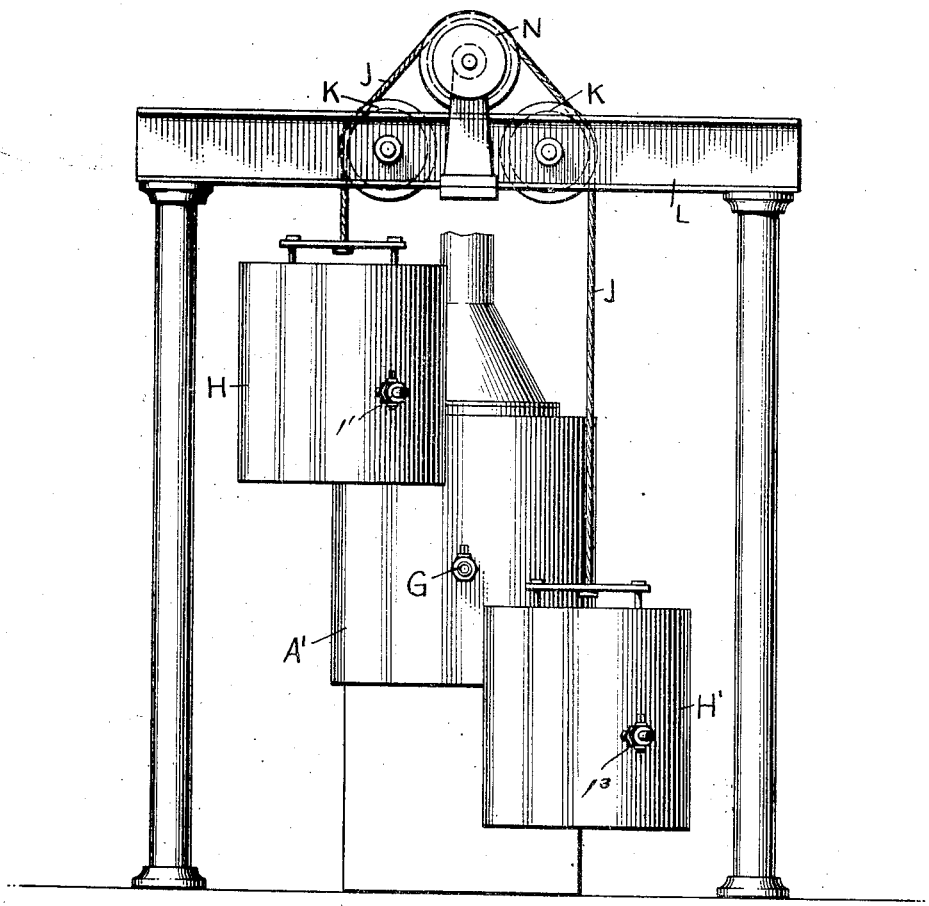

J. F. BEATTIE.
APPARATUS FOR REFINING LEAD.
APPLICATION FILED APR. 1, 1913.

1,078,408.

Patented Nov. 11, 1913.

WITNESSES

INVENTOR
Joseph F. Beattie
BY
ATTORNEYS

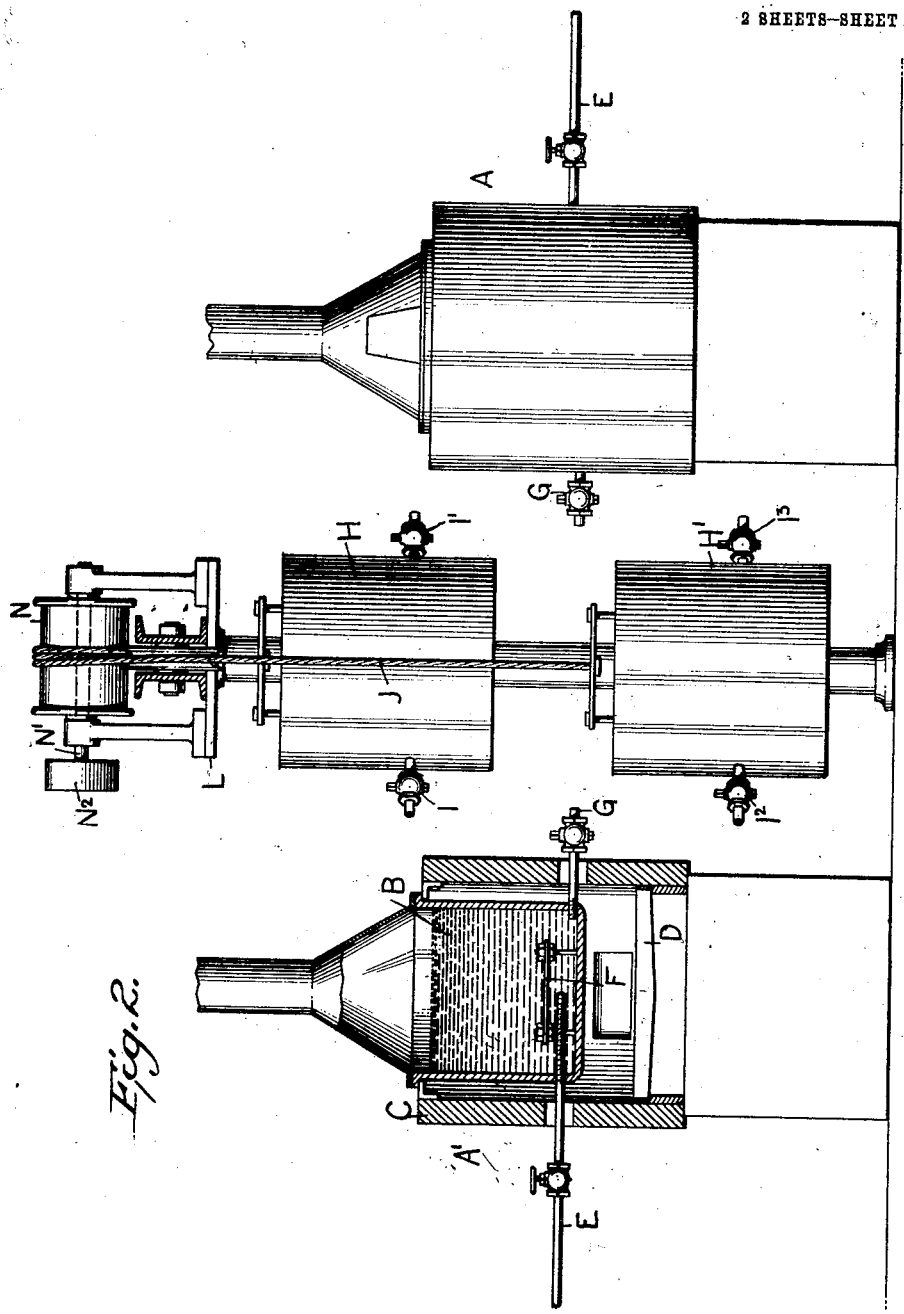

UNITED STATES PATENT OFFICE.

JOSEPH FRANKLIN BEATTIE, OF HAMMOND, INDIANA.

APPARATUS FOR REFINING LEAD.

1,078,408.  Specification of Letters Patent.  Patented Nov. 11, 1913.

Application filed April 1, 1913. Serial No. 758,173.

*To all whom it may concern:*

Be it known that I, JOSEPH F. BEATTIE, a citizen of the United States, and a resident of Hammond, in the county of Lake and State of Indiana, have invented a new and Improved Apparatus for Refining Lead, of which the following is a full, clear, and exact description.

The invention relates to refining, and its object is to provide a new and improved apparatus for refining lead by removing gold, silver, arsenic, antimony, tellurium, bismuth and other impurities.

In order to accomplish the desired result use is made of two separate crystallizers and two separate kettles, the kettles having vertical movement to permit of running the resultant liquid in one crystallizer into a kettle to be transferred to the other crystallizer.

A practical embodiment of the invention is represented in the accompanying drawings forming a part of this specification, in which similar characters of reference indicate corresponding parts in both views.

Figure 1 is an end elevation of the apparatus, one of the crystallizers being omitted; and Fig. 2 is a sectional side elevation of the same, parts being shown in elevation.

In the construction of the apparatus use is made of two crystallizers A and A', spaced apart, and of the usual construction, that is, each crystallizer is provided with a vessel B for the reception of a molten metal, the vessel being inclosed in a suitable shell C provided at the bottom with heating means D for heating the contents of the vessel B. A steam supply pipe E extends into the vessel B at the lower end thereof to discharge steam under a baffle plate F, the steam serving to cool and agitate the molten metal with a view to form crystals, as is well known in carrying out the crystallization process. Each of the vessels B is also provided with a valved drain pipe G for carrying off the liquid as hereinafter more fully explained. Intermediate the crystallizers A and A' are arranged two transferring kettles H and H', of which the kettle H is provided on opposite sides with valved drain pipes I and I' for draining the contents of this kettle into either of the crystallizers A or A', and the kettle H' is likewise provided with valved drain pipes $I^2$, $I^3$ for draining the contents of this kettle into either of the crystallizers A or A', as hereinafter more fully explained. The kettles H and H' are adapted to be raised and lowered into either a draining or receiving position, that is, when in lowermost position the kettle is adapted to receive the liquid from the crystallizer A or A' on opening the corresponding drain pipe, and when the kettle is in an uppermost position its contents can be drained into the corresponding crystallizer A or A' on opening the corresponding drain pipe I, I', $I^2$ or $I^3$. The kettles H and H' are also provided with heating means for keeping their contents in a molten condition.

In order to alternately raise and lower the kettles H and H', use is preferably made of a cable J secured at its ends to the upper ends of the kettles H and H'. The cable J passes over guide pulleys K journaled in a suitable overhead structure L, and the cable J winds and unwinds on a drum N journaled on the overhead structure L and having its shaft N' provided with a wheel $N^2$ connected with other machinery or a motor for rotating the drum N alternately in opposite directions with a view to raise one kettle into draining position while lowering the other kettle into receiving position.

By reference to the drawings, it will be noticed that the crystallizers A and A' are mounted sufficiently high, so that metal may be tapped from a crystallizer into a transfer kettle.

The operation is as follows: Presuming that the apparatus is to be used for refining a metal containing .20% Bi. and presuming that the crystallizer A is filled with a metal containing about .20% Bi. and the crystallizer A' contains metal having about .085% Bi., the transferring kettle H is empty, and the transferring kettle H' contains liquid having about .15% Bi. obtained from the crystallizer A' by a previous operation. A crystallization operation is now carried on in crystallizer A. The result of the crystallization operation in the crystallizer A is the formation of crystals containing .15% Bi. and a liquid having .27% Bi. This liquid is run into the transferring kettle H and is then removed from the latter for further working, and the contents of the kettle H' are now transferred into the crystallizer A, so that the latter now contains crystals and a liquid having each the same percentage of bismuth, that is, .15%.

The crystallization operation in the crystallizer A' results in crystals having .063% Bi. and a liquid containing .11% Bi., and this liquid is now tapped into the kettle H'. Another crystallization operation is now carried on in the crystallizer A to produce a liquid having .20% Bi. and crystals containing about .11% Bi. The liquid is tapped into the transferring kettle H. The liquid in kettle H' is next transferred into the crystallizer A which contains crystals of the same grade .11% Bi. The remaining contents of the crystallizer A' containing about .063% Bi. are now tapped into the transferring kettle H' and part of this metal is delivered outside as purified lead, but a portion equal to the regular liquid portion is retained in the transferring kettle H'. The liquid containing about .20% Bi. in the transferring kettle H is now tapped into the crystallizer A' and a new charge of metal also containing .20% Bi. is added to fill the crystallizer A'.

The next crystallization operation carried on in the crystallizer A produces a liquid containing about .15% Bi. and crystals containing about .085% Bi. The liquid is transferred to the transferring kettle H and the contents of the transferring kettle H' containing about .063% Bi. is tapped into the crystallizer A. A crystallization operation is now carried on in the crystallizer A' containing a liquid of about .20% Bi., so that a liquid is produced of about .27% Bi. and crystals containing about .15% Bi. The liquid of about .27% Bi. is tapped into the transferring kettle H' and is removed for further treatment outside of the apparatus. The liquid in the transferring kettle H containing about .15% Bi. is now tapped into the crystallizer A'.

The crystallization operation is now carried on in the crystallizer A to produce a liquid containing about .11% Bi. and crystals containing about .063% Bi. The liquid is run into the transferring kettle H while the crystals remain in the crystallizer A. The crystallization operation is now carried on in the crystallizer A' to produce a liquid containing about .20% Bi. and crystals containing about .11% Bi. The liquid is transferred to the transferring kettle H' and the liquid from the transferring kettle H containing about .11% Bi. is tapped into the crystallizer A'. The liquid of the crystallizer A containing .063% Bi. is now tapped into the kettle H and the liquid contained in kettle H', and a new charge of metal containing .20% Bi., and in quantity sufficient to fill the crystallizer A is now passed into the latter. A crystallization operation is now carried on in the crystallizer A' to produce liquid containing about .15% Bi. This liquid goes to kettle H'. Crystallizer A' now contains crystals with .085% Bi. Part of the liquid in kettle H is put into crystallizer A' and part delivered as a purified lead. The result is now a condition practically the same as at the beginning and the above-described operation is repeated.

From the foregoing it will be seen that by the operation described, the metal is gradually refined and run off as purified lead and an enriched lead periodically discharged for further treatment, the whole operation being carried on by the use of two crystallizers and two transferring kettles as described.

Having thus described my invention, I claim as new and desire to secure by Letters Patent:

1. An apparatus for refining lead, comprising two stationary crystallizers, two movable kettles, and means for moving the kettles alternately into receiving position relative to one crystallizer and into transferring position relative to the other crystallizer.

2. An apparatus for refining lead, comprising two spaced and fixed crystallizers, a pair of transferring kettles arranged between the said crystallizers, and means to alternately raise and lower the said kettles, one into receiving position relative to one crystallizer and the other into transferring position relative to the other crystallizer.

3. An apparatus for refining lead, comprising two spaced and fixed crystallizers, a pair of transferring kettles arranged between the said crystallizers, an overhead frame to support a drum, a cable on the said drum and having the ends connected with the said kettles to raise one while lowering the other, and driving means for rotating the drum alternately in opposite directions.

In testimony whereof I have signed my name to this specification in the presence of two subscribing witnesses.

JOSEPH FRANKLIN BEATTIE.

Witnesses:
J. FLOYD IRISH,
ZELLA IRISH.